Patented July 7, 1953

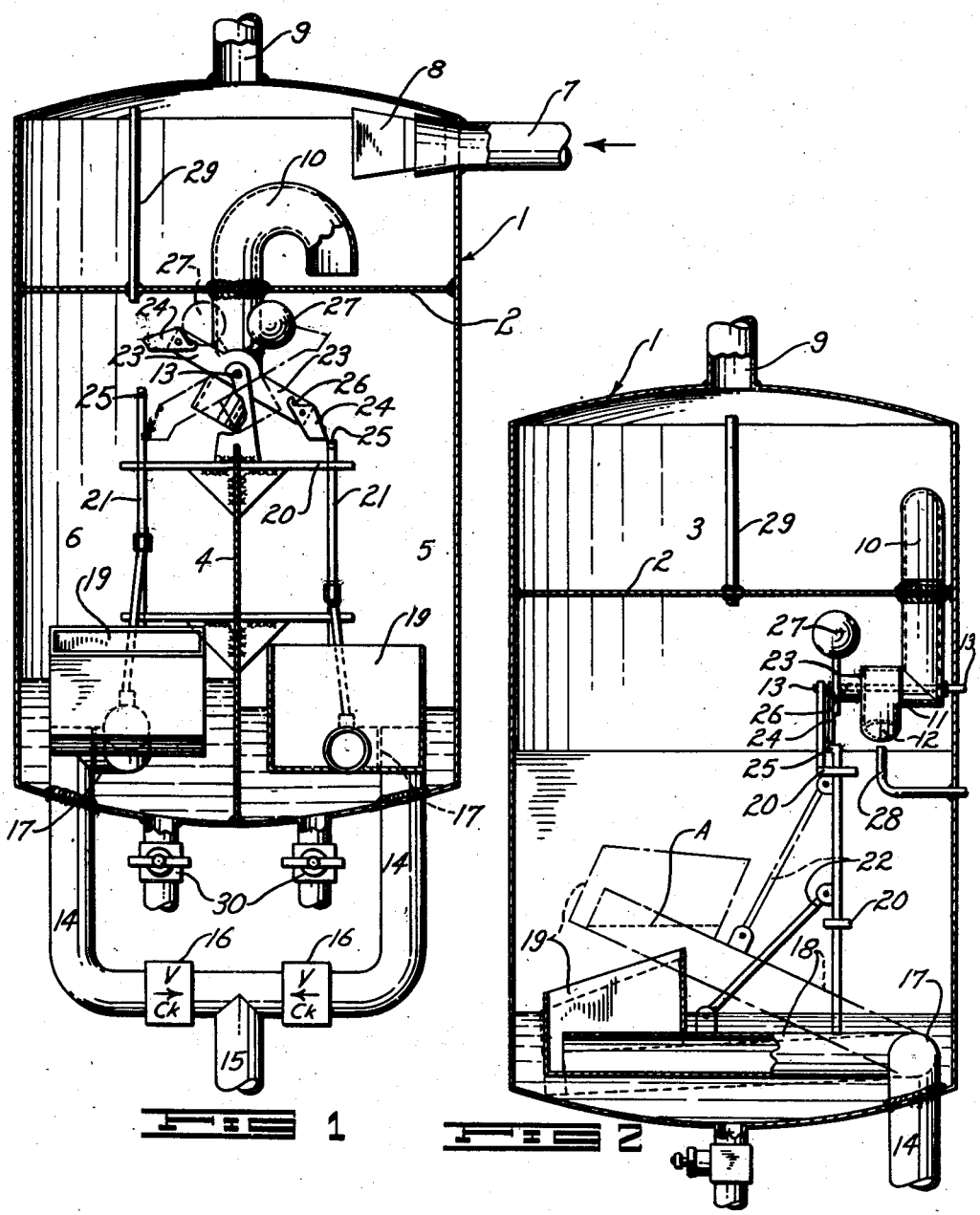

2,644,333

UNITED STATES PATENT OFFICE 2,644,333

LIQUID METER

Ray Duus, Beverly Hills, Calif.

Application February 23, 1949, Serial No. 77,703

3 Claims. (Cl. 73—219)

My invention relates to liquid meters and particularly to meters of the displacement type, and included in the objects of my invention are:

First, to provide a liquid meter which may be employed in an open system or in a pressure system.

Second, to provide a liquid meter which is particularly designed to handle crude petroleum oil or other liquids which may contain various amounts of solids or other foreign matter, or may be charged with gas.

Third, to provide a liquid meter which functions accurately, even though the flow rate of the liquid should vary over a wide range or become irregularly intermittent, or should vary in viscosity.

Fourth, to provide a liquid meter whereby periodically a small sample of the liquid being measured is diverted and collected for test purposes or other use.

With the above and other objects in view as may appear hereinafter, reference is directed to the accompanying drawings, in which:

Fig. 1 is a substantially diagrammatical longitudinal sectional view of my liquid meter, and Fig. 2 is another diagrammatical sectional view taken at right angles to Fig. 1.

My liquid meter is housed in a shell 1 which is divided by a horizontal partition 2, to form a gas-liquid separator chamber 3 at the upper end of this shell. Extending upwardly from the lower end of the shell 1 is a vertical partition 4, which terminates in spaced relation to the partition 2 and divides the shell into a pair of metering chambers 5 and 6; these chambers being connected at their upper portions. A fluid intake 7 communicates with the separator chamber 3. The liquid to be measured is introduced through this intake and may be charged with gas. A baffle means 8 is provided to minimize jetting of the incoming liquid. The separator chamber is large enough that any gas contained in the liquid may have opportunity to separate. Such gas is removed through an outlet 9.

Fitted in the partition 2 is a liquid siphon 10 which communicates between the lower portion of the separator chamber to the upper extremities of the metering chamber, preferably in centered relation to and above the vertical partition 4. The lower end of the siphon 10 is provided with a pivot elbow 11 terminating in a spout 12 which may be pivoted or oscillated across the vertical partition 4 to discharge liquid into one or the other of the metering chambers 5 and 6. The pivot elbow is equipped with a shaft 13, which projects through the shell 1 and is adapted for connection to a conventional counter mechanism (not shown).

Outlet tubes 14 extend downwardly from each metering chamber and are connected to a common discharge line 15. Check valves 16 may be interposed to prevent back flow from one outlet to the other.

The inner or intake end of each tube 14 is provided with a swivel connection 17 from which extends a tubular float lever arm 18 at the free extremity of which is mounted a float 19 open at its upper portion.

Supported from the vertical partition 4 by means of mounting brackets 20, is a pair of vertical pull rods 21 which are joined by connecting rods 22 to the float lever arms 18. The shaft 13 protrudes from the pivot elbow 11 and is equipped with a walking beam 23 the extremities of which are provided with dog levers 24. The dog levers are engageable by lugs 25 provided at the upper extremities of the pull rods 21. Means such as pins 26 are provided to limit pivotal movement of the dog levers so that the pull rods are free to move upwardly past the dog levers to catch and engage the dog levers when the pull rods move downward. An overbalanced weight 27 is supported by the shaft 13 so that the spout 12 tends to occupy one or the other of its extreme portions as indicated by solid and by broken lines in Fig. 1.

Centered in the shell 1 directly below the path of the spout 12 is a sampler tube 28 which extends laterally from the shell for discharge into a suitable sample container not shown.

The separator chamber 3 may be provided with a small gas tube 29 communicating from the upper extremity of the separator chamber to the upper extremities of the meter chambers.

Suitable valve controlled drains 30 are provided at the bottom ends of the metering chambers.

Operation of my liquid meter is as follows:

Incoming fluid which may be at atmospheric or under nominal pressure, or under high pressure, and which may be charged with gas, and furthermore may contain solids or other foreign matter, enters through the intake 7. Most if not all of the gas that may be contained in the liquid has opportunity to escape through the gas outlet 9. When or as long as the liquid level is above the neck of the siphon, the liquid is discharged into one or the other of the metering chambers through the spout 12. The spout 12, aided by the weight 27, directs all of the liquid into one or the other of the chambers.

Assuming the conditions shown in Fig. 1 in which chamber 5 has discharged its capacity of liquid and chamber 6 is in the process of being filled, it will be observed that both open floats 19 are empty and buoyant. A liquid discharging into chamber 6 raises the level therein, causing the float to raise until the pull rod is limited or restrained in its upward movement. Further filling of the chamber 6 raises the liquid level until it is above the rim of the float; by reason of the fact that the tubular arm is inclined at a substantial angle, and its inlet is located at the far side of the float, an appreciable quantity of the liquid may fill the float before the level of the inlet end is reached. This is sufficient to overcome the buoyancy of the float and cause it to submerge to the lowermost broken line position shown in Fig. 2. In moving downward, the corresponding pull rod engages a dog lever and tilts the walking beam to direct the liquid into chamber 5, as indicated by broken lines in Fig. 1. The liquid in chamber 6 continues to drain therefrom until the condition in chamber 6 corresponds to that shown in chamber 5, during which time chamber 5 fills with liquid. The oscillating movements of the walking beam and its shaft 13 operate a suitable counter. Inasmuch as the effective volumes of the metering chambers may be predetermined, the amount of liquid passing through the meter may be calculated.

With each oscillation of the spout 12, a small quantity of liquid enters the sample tube 28.

It is essential that air or gas be maintained above the liquid in the metering chambers 5 and 6. If the meter is employed in a pressure system, a gaseous atmosphere may be maintained by the gas tube 29.

Having fully described my invention, it is to be understood that I do not wish to be limited to the details herein set forth, but my invention is of the full scope of the appended claims.

I claim:

1. A liquid meter, comprising: a shell structure defining a pair of metering chambers; shiftable inlet means for discharging liquid into either of said metering chambers; an outlet from each of said chambers; a hollow float in each of said chambers, open at its upper side, the interior of said float communicating with the outlet of its corresponding chamber and isolating said outlet from said chamber when said float is buoyed therein, and the liquid level is below the upper open side of said float; means for restraining upward movement of said float, each of said floats adapted when restrained by said means and the liquid level rises above its open side to submerge and receive liquid for discharge through its corresponding outlet; and means connecting said floats with said inlet means to shift said inlet means from one metering chamber to the other in response to submergence of the alternate float.

2. A liquid meter, comprising: a pair of metering chambers; an outlet for each chamber including a pivotally mounted tubular arm; a hollow float open at its upper end to receive liquid thereover and carried by each arm, the interior of each float being in communication with its associated outlet through its associated arm, the communication being such that when said float is elevated entrance to said tubular arm is sufficiently above the lowermost point of the float that an overbalancing quantity of liquid may be entrapped in said float before discharge through said arm therefrom, thereby to cause said float to sink; means for limiting elevation of said float to permit flow of liquid into said float over the open upper end thereof; inlet means for said metering chambers; and operative connections between said inlet means and each of said floats to direct liquid into one chamber upon submergence of the float in the other chamber.

3. A liquid meter, comprising: a pair of metering chambers; inlet means for directing liquid alternately into said chambers; outlet means for each of said chambers, each outlet means including a movable buoyant float member open at its upper side; means limiting buoyant movement of said float member whereby when the liquid in its corresponding metering chamber has exceeded a predetermined level, said float receives a buoyancy overbalancing quantity of liquid and sinks thereby to discharge of the contents of said metering chamber through said outlet; and means connecting each of said outlet means with said inlet means to direct liquid in one chamber as the float member in the other chamber submerges and said other chamber is emptying.

RAY DUUS.

References Cited in the file of this patent

UNITED STATES PATENTS

| Number | Name | Date |
|---|---|---|
| 1,340,293 | Roach et al. | May 18, 1920 |
| 2,105,262 | Price | Jan. 11, 1938 |

FOREIGN PATENTS

| Number | Country | Date |
|---|---|---|
| 12,922 of 1850 | Great Britain | Jan. 13, 1850 |